July 21, 1925.

W. F. STOUFFER

SEAT UPHOLSTERING

Filed Oct. 24, 1921

1,547,132

Inventor
W. F. Stouffer
By his Attorneys
Blackmore, Spencer & Flint

Patented July 21, 1925.

1,547,132

UNITED STATES PATENT OFFICE.

WILLIAM F. STOUFFER, OF FLINT, MICHIGAN, ASSIGNOR TO GENERAL MOTORS CORPORATION, OF DETROIT, MICHIGAN, A CORPORATION OF DELAWARE.

SEAT UPHOLSTERING.

Application filed October 24, 1921. Serial No. 510,026.

*To all whom it may concern:*

Be it known that I, WILLIAM F. STOUFFER, a resident of Flint, county of Genesee, and State of Michigan, have invented certain new and useful Improvements in Seat Upholstering, of which the following is a full, clear, concise, and exact description, such as will enable others skilled in the art to which the invention relates to make and use the same, reference being made therein to the accompanying drawings, which form a part of this specification.

The invention relates to upholstering and is more particularly concerned with the application of upholstery to seats, such, for example, as the seats ordinarily employed in the equipment of motor vehicle bodies.

In the manufacture of vehicle bodies it has hitherto been common practice to finish the seat backs by applying a facing material, usually leather, in a sheet larger than actually necessary for the finished back, stretch the material to the extent deemed proper by the workman, secure it in place, as by tacking, and then trim off the excess around the edges. This operation not only involves waste of the expensive finishing or facing material but requires considerable skill on the part of the workman and necessarily results in non-uniformity in the product.

The principal object of my invention is to provide a means and method whereby the disadvantages of the procedure above outlined may be eliminated and whereby upholstery may be applied with much greater uniformity in results and with a saving in time, labor, and expense.

The invention comprises, briefly, the preparation of the upholstery for a seat back, or other part to be covered, with the facing material of predetermined size appropriate to the part to which it is to be applied, securing this facing to the usual backing, padding being placed between the two if desired, the backing, which will be presumably of relatively cheap material, as burlap, being preferably allowed to extend some distance beyond the facing material at the edges, and then applying the upholstery to the frame structure of the seat or the like. By this means the upholstery may be secured by tacking to a trim rail, for example, first along one side, and then may be stretched to position and tacked along the other sides, the edges of the facing serving, in cooperation with the frame, as a gage to determine the extent of stretching required and the excess backing providing means whereby the workman may secure a grip to pull the upholstery to its proper position.

Figure 1:
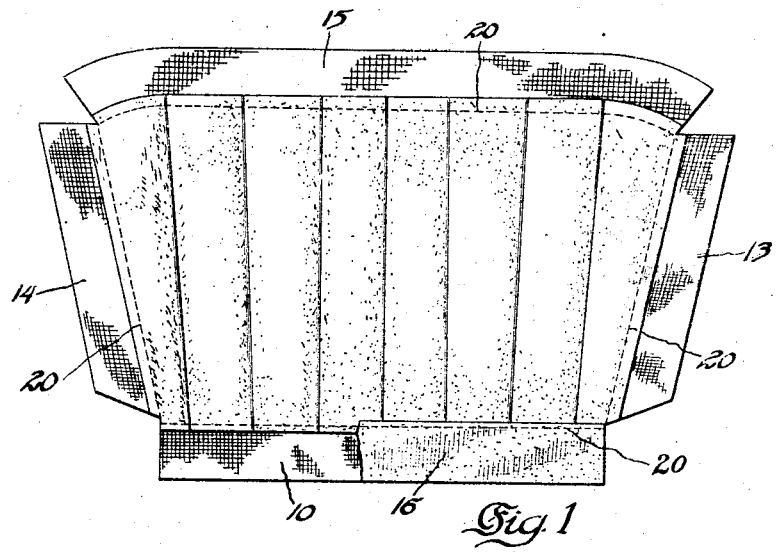
Figure 2:
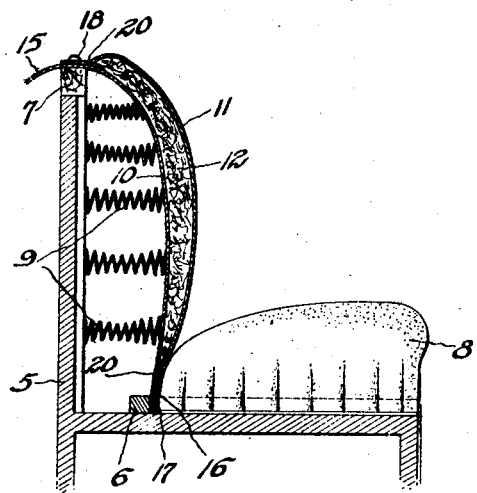

In the accompanying drawings illustrating one embodiment of the invention Figure 1 is a plan view of an upholstery blank ready for mounting upon a seat back, and Figure 2 is a vertical section showing the blank applied to a seat frame.

Referring to the drawings, 5 indicates a seat frame, which may form part of the body of a motor vehicle, and which comprises a trim stick 6 and a top trim rail 7. A seat cushion 8 may be removably supported upon the frame and back springs 9 are mounted in any usual or suitable manner upon the back portion of the frame.

The upholstery blank to be applied to the seat back comprises the backing 10, preferably of relatively cheap material, such as burlap, the facing material 11, which may be of leather, pleated as shown, and the padding 12. The backing is permitted to extend beyond the facing 11, preferably on three sides, to form flaps 13, 14, 15, while the facing is cut to predetermined and exact size for the part to be covered. The parts will be fastened in assembled relation by any suitable means as by the stitching indicated at 20. A strip 16 of artificial leather or like material may be used to constitute a portion of the blank at the lower edge where the upholstery will be covered by the rear face of the seat cushion 8.

In applying the blank to the seat frame, the lower edge of the facing sheet, or of the strip 16 if the latter be used, is first tacked to the trim stick 6 as indicated at 17. The blank is then stretched upwardly and rearwardly over the back springs, the flap 15 being utilized as gripping or pulling means, until the edges of the facing 11 coincide with the rear edge of the trim rails to which the upholstery is to be secured, as the rail 7. The blank may then be secured by tacking or like means, as indicated at 18. The side edges will, of course, be secured to suitable side rails (not shown) in a manner similar to that shown for the top rail. The flaps 13, 14, 15, may then be cut away.

It will be noted that the bringing of the edge of the facing material even with the rear edge of the trim rail serves to gage accurately the extent of stretching necessary, and since the blanks are all made up of exactly the same size no special skill is required in applying them. The backs may therefore be readily and quickly assembled in car bodies by workmen who have had no special training in the art of body trimming. The use of the invention therefore results in a saving in the skilled labor required as well as in the time necessary in the assembly line, the blanks being manufactured in a separate shop where the work may be carried on to the best advantage. The cutting of the relatively expensive facing material to the exact size required for the finished upholstery also eliminates waste.

It will be understood that modifications in the procedure and in the details of the blank may be made without departing from the scope of the invention or sacrificing its advantages and therefore I do not wish to be limited to the specific features described except as required by the language of the appended claims in view of the prior art.

I claim:

1. The method of upholstering which comprises assembling an upholstery blank having a facing cut to the exact size required for the finished upholstery and a backing extending throughout the area of the facing and beyond the edge thereof, applying the assemblage to a support, stretching the facing by force applied to the projecting portion of the backing, securing both facing and backing permanently to the support, and removing the projecting portion of the backing.

2. The method of upholstering backs of vehicle body seats including a frame having upper and lower trim rails, said method comprising the preparation of a blank including facing material cut to the size necessary for the finished upholstery and a backing of larger size, securing said blank to the bottom rail, stretching the blank over the top rail by means of the projecting backing material until the edge of the facing is brought to the final position, securing the upholstery to the top rail, and trimming away the excess backing.

3. An upholstery blank comprising a facing cut to predetermined shape and size to correspond with the dimensions of an upholstery frame, a backing of relatively cheap material covering the back of said facing and secured thereto, the edges of said backing extending beyond the facing material at the edges to afford gripping means for stretching the blank over said frame, and padding between said backing and facing.

4. An upholstery blank comprising a facing cut to predetermined shape and size to correspond with the dimensions of a seat frame, a backing secured to said facing and extending beyond the edge of the latter to afford gripping means for stretching the blank over said frame, padding between said facing and backing, and a strip of relatively cheap facing material secured along one side of the blank.

5. An upholstery blank adapted for use in upholstering the backs of vehicle seats comprising a facing of relatively expensive material shaped to approximately the dimensions of the completed upholstery, and a backing of relatively cheap material secured to said facing and extending beyond the facing at the top and side edges of the latter to afford gripping means for stretching the blank over the seat frame.

6. An upholstery blank for use in upholstering the backs of vehicle seats comprising a facing of relatively expensive material shaped to approximately the dimensions of the completed upholstery, a backing of relatively cheap backing material secured to said facing and extending beyond the facing at the top and side edges of the latter, and a strip of relatively cheap facing material arranged at the bottom edge of the blank and extending beyond the edge of the more expensive material at the bottom.

In testimony whereof I affix my signature.

WILLIAM F. STOUFFER.